United States Patent

Alvarez

[15] 3,704,539
[45] Dec. 5, 1972

[54] POISON BAIT STATION FOR SMALL BUGS OR THE LIKE

[72] Inventor: Bernard V. Alvarez, Route 1, Box 32, Inman, S.C. 29349

[22] Filed: Oct. 12, 1971

[21] Appl. No.: 188,167

[52] U.S. Cl. .................................................. 43/131
[51] Int. Cl. .............................................. A01m 1/20
[58] Field of Search........43/131, 129, 125, 124, 109; 239/60

[56] References Cited

UNITED STATES PATENTS

| 738,363 | 9/1903 | Shelton | 43/131 |
| 759,030 | 5/1904 | Sheaffer | 43/131 |
| 1,633,982 | 6/1927 | Davis | 43/131 |
| 1,960,464 | 5/1934 | Thalheimer | 43/131 |
| 2,953,868 | 9/1960 | Chambers | 43/131 |

Primary Examiner—Warner H. Camp
Attorney—Wellington M. Manning, Jr.

[57] ABSTRACT

A poison bait station is disclosed that is capable of deployment within the household so as to position a poison at any desired location and attitude along a path used by roaches, ants, bugs or the like. The poison station of the present invention is designed to prevent access to the poison by children or dogs, cats or other pets; to permit installation at virtually any desired location; and to maintain the poison in place during use without the danger of inadvertent spreading of the poison. The instant poison station comprises a cover that may be of unitary or two piece construction, said cover having a centrally located member secured thereto and depending therefrom, around which a unitary poison tablet, gel or the like is positioned and secured. A fastening member and/or a pressure sensitive adhesive are incorporated into the design to permit semi-permanent securement of the station to virtually any surface. Furthermore, the cover is preferably transparent whereby one can visually inspect the device from time to time to determine whether any poison remains therein. Spacers may also be provided around the cover to limit the degree of securement of the station while simultaneously determining the size of the opening under the cover through which the bug, etc. may pass to reach the poison. A shield may also be made a part of the station to permit outside use where the poison is disposed in a vertical plane.

22 Claims, 7 Drawing Figures

PATENTED DEC 5 1972 3,704,539

INVENTOR.
BERNARD V. ALVAREZ
BY Wellington M. Manning Jr.
ATTORNEY

POISON BAIT STATION FOR SMALL BUGS OR THE LIKE

BACKGROUND OF THE INVENTION

A constant awareness persists toward the destruction and control of small household pests, including bugs, roaches, insects and the like. Due to the presence of small children and pets, however, any extermination must be carried out in a safe and efficient manner. Otherwise unwary children or pets may mistakenly take the poison and become ill or die. Normally, a poison bait station is designed for placement on a floor, in a drawer, in a cabinet or the like where it rests on the bottom of the area in which it is placed. Moreover, those stations providing securement means therewith are designed for placement in one manner only. Both types of stations employ particulate or liquid poison which is subject to spillage, leakage and the like unless extreme care is taken. In general, poison bait stations being produced today are quite ineffective in providing an efficient means for extermination of household pests and at the same time are safety hazards.

A vast amount of effort has been expended in the past in the design of poison bait stations to render them both effective and safe. The poison has been presented behind barriers of sorts that prevent a child or pet from reaching same. The majority of these poison bait stations have been designed for extermination of rats or the like in the out of doors, in barns and other locations without the household. Very little effort has been expended, however, towards producing a truly safe poison bait station for use within the home. Prior devices used within the home or the like in general include a tunnel or passageway structure through which the small pests must pass to reach a particulate or liquid poison. These devices are oftentimes capable of complete destruction by moisture since many are constructed from cardboard or the like. A particulate poison is also normally used which may very easily be removed from within the dispenser by an ant, rat or the like and thus be exposed to consumption by a child or a pet. The poison may be spilled when the dispenser is turned over or opened by the pest or by accident. Furthermore, these particular dispensers have thus been limited in use to an approximate level area where they are placed. It is not unusual that the roaches, ants, etc. follow a path under a counter ledge, over a window sill, along a baseboard, through a cabinet, however, where the conventional bait station cannot be used due either to its structure or the danger of poison spillage.

The present invention is a definite improvement over any device heretofore known due to its use of a unitary poison as opposed to a particulate or liquid poison; its versatility in placement, such that the attitude of the device is irrelevant insofar as the successful deployment is concerned; due to the fact that it provides a truly safe device having a unitary poison that cannot normally be reached by children or pets; due to its economical manufacture; and due to the fact that it is simple for a housewife or the like to position the dispenser at any desired location. The present invention thus represents a truly new and novel approach to a poison bait station that may be used internally or externally of the home.

As mentioned earlier, there has been a great deal of effort expended in the development of a successful poison bait station. There is nothing in the prior art, however, that teaches or suggests the structure of the instant poison bait station. Representative of the prior art are the following U. S. Pat. Nos. 478,691 to De Shon; 738,363 to Shelton; 1,443,287 to Snyder et al; 1,471,954 to Greenway; 1,820,186 to Gaskins; 1,856,200 to Tippey; 1,887,771 to Marsh; 2,205,125 to Rose; 2,239,937 to Smith; 2,291,358 to Treadwell et al; 2,710,485 to Starr; 2,725,663 to Mullen; 2,808,679 to Collins; 3,295,246 to Landsman et al and 3,427,743 to Brunner et al.

SUMMARY OF THE INVENTION

It is an object of the present invention to provide a novel poison bait station.

Another object of the present invention is to provide a novel poison bait station that utilizes a unitary poison and may be deployed at any desired attitude without the danger of the poison falling therefrom.

Still further, another object of the present invention is to provide a novel poison bait station that may be secured at any location within the home without endangering pets or children.

Another object of the present invention is to provide a small compact poison bait station that may be economically manufactured while being effective to destroy small insects, bugs or the like in a safe and efficient manner.

Generally speaking, the present invention relates to a poison station for small bugs or the like comprising a protective cover; a member secured to one side of said cover at a generally central location and extending downwardly therefrom; a unitary poison bait positioned around said generally centrally located member and secured thereat; and means to secure said station in position at any attitude, said cover, centrally located member and poison being dimensionally cooperative to permit only limited access to said poison.

More specifically, the poison station of the present invention is provided with a cover that may be opaque or transparent, though preferably transparent, to enable one to visually inspect the station to determine the continued presence of poison therein. The cover may be of one piece construction having a generally centrally located member secured to one side thereof and extending outwardly therefrom. The centrally located member may be blunt at the outer end thereof or may be pointed at the outer end to provide securing means. A unitary poison is received around the centrally located member and secured thereat by a friction fit, an adhesive, flange, series of concentric rings, cooperative wedges, or the like to prevent inadvertent removal therefrom. An adhesive bond between the poison bait and the centrally located member will further prevent the whole bait from falling out of the station should a portion of the bait become eaten away or chipped off. The adhesive bond is thus preferred.

A further embodiment of the cover includes a top and a bottom section where at least one generally centrally located member is secured to one side of at least one of said sections and is securable to the other of said sections. The securement to the other of said sections may be through a telescoping arrangement with a further centrally located member, a friction fit into a groove in the underside of said other section, a threaded connection or the like. In all of these variations, the unitary poison bait is received around the central member or members and is secured thereat.

Insofar as means to secure the device in place are concerned, the device may be provided with a centrally or otherwise located fastening member receiving opening. Such opening or openings may receive a tack, small nail or the like therethrough which can be driven into a baseboard, under a table, or the like to attach the station at the desired location. Furthermore, a pressure sensitive adhesive may be provided across a surface of said station or surfaces of said station so as to enable the station to be adhesively secured in place. Both means are preferred for the station to provide a desired flexibility and permit the user to select the securement means desired.

The poison station of the present invention thus provides a means for dispensing a poison for the extermination of small bugs and the like while preventing access thereto by pets or small children. Moreover, the instant poison station in cooperation with the unitary poison employed therewith, is suitable for attachment at vertical, horizontal or angular attitudes, thus enabling placement at any precise location when the pests may pass.

Certain embodiments of the poison station of the present invention are well suited for different applications. For example, a shield may be applied partially around the cover so as to permit utilization of the station out of doors and in a vertical disposition. The shield which may be integral with the cover or separate therefrom, will thus protect the poison from rain or the like while still permitting access thereto by insects, bugs and the like. A further important feature is the preferred clear cover for the station. With a clear cover, one may visually determine at any time, the condition of the poison. Hence one need not remove the station to check the poison supply. If the poison has become spent, a new ring of poison or the like may be conveniently used to replace the spent poison and the device redeployed for the destruction of bugs or the like.

DESCRIPTION OF THE SPECIFIC EMBODIMENTS

Figure 1:
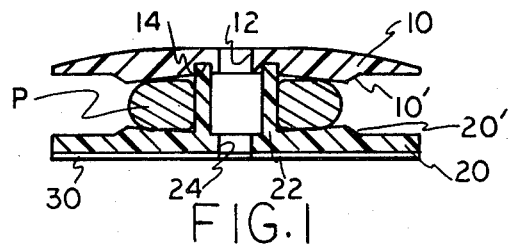
FIG. 1 is a vertical cross sectional view of a poison station according to the teachings of the present invention.

Referring to the Figures, the specific embodiments of the present invention will now be described in detail. In FIG. 1, there is shown in cross section, a particular embodiment of the poison station of the present invention. A poison station is thus shown having a top cover 10, a bottom cover 20 removably secured to top cover 10 and a unitary poison P received therebetween. Top cover 10 is shown having a central opening 12 therethrough and an annular recess 14 therearound on the underside of cover 10. Bottom cover 20 is shown having a member 22 secured thereto and extending upwardly therefrom. Member 22 is shown as a hollow cylindrical member that is in frictional engagement with top cover 10 in annular recess 14. Bottom cover 20 likewise has a central opening 24 that is disposed in alignment with opening 12 of top cover 10 where the two covers are united. Further, top cover 10 and bottom cover 20 are both shown to possess an annular wedge 10' and 20' respectively. Wedges 10' and 20' cooperate to entrap poison P against member 22. As desired, wedges 10' and 20' may be continuous or interrupted to prevent portions of poison P from falling from the bait station. A layer of a pressure sensitive adhesive 30 is shown along the underside of bottom cover 20 so as to provide a means for securing the poison station shown in FIG. 1 in place. Openings 12 and 24 likewise define a passage through which a fastening member might extend to serve as a securement means for the station.

As discussed and shown herein a unitary poison P is positioned around a generally centrally located member for each embodiment of the present invention. Obviously, the particular design of the instant poison station renders same very suitable for deployment in small, out-of the way locations where the pests are very likely to reside and/or pass. In this environment the overall dimensions of the poison station are rather small. The same concept may, however, be used for a larger poison station where the pest population is substantial. The larger station may thus utilize more than a single poison bait. Hence the member around which the poison bait is secured need not be centrally located though for the single bait station such placement is preferred.

Unitary poison bait, as used herein refers to a coherent mass of poison that is not likely to separate during normal use. Such bait could take the form of a compressed annular tablet, a glob of poison where the active ingredients are held together by a gel of some type to assimilate a consistency of a thick paste, a soft shape similar to a gum drop where the poison is also held in place by a binder, and the like. Poison bait in these forms may be successfully employed with the bait stations of the present invention whereby safety is fostered, poison may be readily consumed by pests and appearance is greatly enhanced. In each of the poison types mentioned above, several means of securing the poison of the poison holding member are available. The simplest arrangement is dimensional cooperation between the bait and the member to achieve a friction fit therebetween. The poison holding member may, as will be described hereinafter, be equipped with a peripheral flange which engages and holds the poison bait in place. Also, numerous adhesives may be used to bond the poison bait to the member. A preference for the particular means for securing the bait to the member should be determined by the particular consistency of the bait, the design of the bait holding member and the environment in which the station is to be used.

Figure 2:
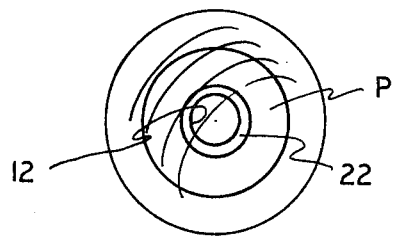
FIG. 2 is a top plan view of the poison station shown in FIG. 1.

FIG. 2 is a top plan view of the poison station shown in FIG. 1. As shown in FIG. 2, top cover 10 of the poison station is manufactured of a transparent material thus permitting the poison P to be visible therethrough. It should also be noted in FIGS. 1 and 2 that the poison P resides around and is secured at generally centrally located member 22. The poison being of unitary structure will not fall from within the poison station by virtue of its annular configuration. Likewise, the poison will not flake off and fall from within top cover means 10 and bottom cover member 20 under normal conditions. Preferably, the poison P is of such a size that there is sufficient distance between the outer edge of the poison and the outer periphery of the poison station to prevent access thereto by pets and small children.

Figure 3:
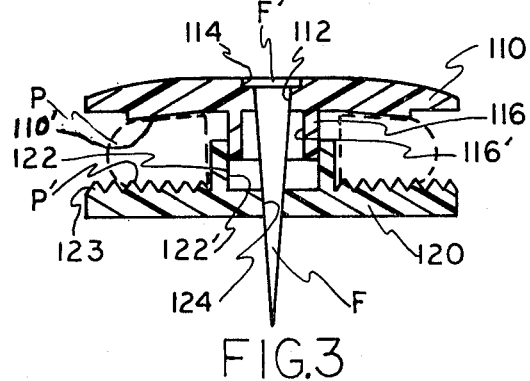
FIG. 3 is a vertical cross sectional view of a further embodiment of a poison station according to the teachings of the present invention.

A further embodiment of the poison station of the present invention is shown in FIG. 3. The station in FIG. 3 comprises a top cover member 110 having a centrally located opening 112 that is countersunk at 114 to receive a fastening member F therein in such a manner that the head F' of the fastening member F is flush with or beneath the top cover 110 of the poison station. Top cover member 110 further has a centrally located member 116 secured to the underside thereof and extending downwardly therefrom. Member 116 is cylindrical in shape and has an opening 116' therethrough. Bottom cover member 120 has a centrally located member 122 secured thereto and extending upwardly therefrom. Member 122 is likewise cylindrical in shape, has an annular opening 122' that is of a dimension such that it receives cylindrical member 116 of top cover 110 in telescoping fashion. Member 116 thus resides within opening 122' of member 122 and preferably provides a friction fit therebetween to unite covers 110 and 120. Bottom cover 120 further has a centrally located opening 124 therein, opening 124 being smaller in size than its corresponding opening 112 in top cover 110. As thus shown in FIG. 3, fastening member F may pass through openings 112, 116' and 124 to secure the poison station in a desired location. The difference in size of openings 112 and 124 is such that fastening member F will snugly reside therein and prevent unnecessary lateral movement of the station after same has been secured.

Top cover member 110 is shown to have an annular wedge 110' on the underside thereof, around member 116. Further, bottom cover member 120 has a plurality of concentric ridges 123 around member 122. A poison bait P having a ridged surface P' mates with ridges 123 and are held thereon by wedge 110'. Hence the poison P will be held in place should a portion thereof be broken or eaten away. Also, ridges 123 on bottom cover 120 will provide an irregular surface to assist bugs or the like in reaching the poison P should the station be mounted at a vertical attitude.

Figure 4:
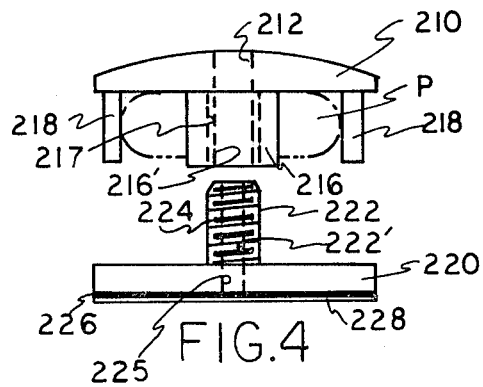
FIG. 4 is a vertical exploded view of an embodiment of a poison station according to the teachings of the present invention.

A further embodiment of the poison station according to the teachings of the present invention is shown in FIG. 4 wherein a top cover member 210 is provided having an opening 212 therein. Top cover member 210 has a cylindrical member 216 secured thereto and depending downwardly therefrom. Member 216 is provided with an internal opening 216' having threads 217 therein. Top cover member 210 is also provided with a plurality of protuberances 218 secured to the underside thereof and extending downwardly therefrom. Protuberances 218 should be at least as long as the thickness of a poison bait P to be used in conjunction therewith and may be spaced around the periphery of cover 210 at any desired interval. A bottom cover member 220 is also provided, having a cylindrical, centrally positioned member 222 secured thereto and extending upwardly therefrom. Member 222 has threads 224 along at least a portion of its length. Threads 224 mate with internal threads 217 of member 216 to permit bottom cover 220 to be removably secured to top cover 210. Upstanding member 222 of cover 220 has a central opening 222' therein that coincides with an opening 225 in bottom cover 220. Openings 212, 222' and 225 thus define a passageway through the poison station for receipt of a nail or the like that may be used to secure the station in place. An adhesive layer 226 is also provided across the lower surface of bottom cover member 220 as a second choice of fastening means for the station. Furthermore, a sheet 228 is provided on top of adhesive layer 226 so as to prevent same from inadvertently becoming bonded to objects or accumulating dirt, dust and the like. Sheet 228 is easily removable from the underside of cover member 220 to expose the adhesive surface when it is desirable to bond the poison station to a particular object or at a particular location.

Figure 5:
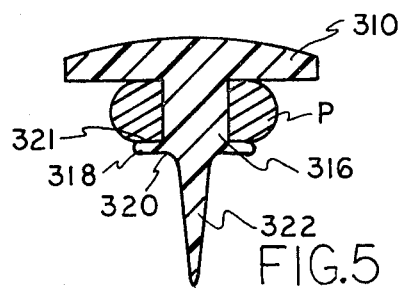
FIG. 5 is a vertical cross sectional view of an embodiment of a poison station according to the teachings of the present invention.

FIG. 5 shows still a further embodiment of the present invention wherein a cover 310 is provided having a member 316 secured to the underside thereof and extending downwardly therefrom. Member 316 is provided with an annular flange 318 intermediate its length, said flange having a beveled undersurface 320 and a flat upper surface 321. The lower end 322 of member 316 is reduced in size to provide a fastening member for securing the station in place. An annular poison bait P may thus be forced over the lower end 322 of member 316 and over the beveled edge 320 of peripheral flange 318 to reside around member 316. The flat upper surface of flange 318 precludes the inadvertent removal of poison P in the reverse direction. As desired, member 316 may be integral with cover 310 or appropriately associated therewith. Moreover, depending upon poison bait P, it may be desirable for flange 318 to be of a resilient material whereby bait P is more easily forced thereover during installation of bait P. As such, flange 318 may be an O-ring or the like positioned around member 316.

Figure 6:
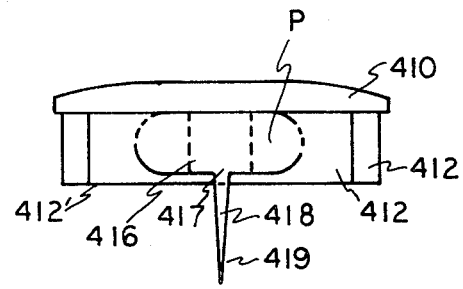
FIG. 6 is a vertical cross sectional view of still a further embodiment of a poison station according to the teachings of the present invention.

FIG. 6 sets forth still a further embodiment of the present invention. A cover 410 is shown having a poison bait holding member 416 secured to the underside thereof and depending downwardly therefrom. Poison bait holding member 416 has a large diameter section 417 at an upper end thereof and a small diameter section 418 at a lower end, said small diameter section 418 terminating as a point 419. Hence, a poison bait P may pass over small diameter section 418 of member 416 and fit snugly around large diameter section 417 thereof. Further, member 416 may be integral with cover 410 or associated therewith. Cover 410 also has a skirt 412 secured thereto around only a portion of the periphery thereof. Skirt 412 extends downwardly from cover 410 for a distance at least sufficient to extend below the poison bait P. With a skirt 412 as a part thereof, the poison station may be used out of doors on the side of a building or the like. With member 416 in a horizontal position and skirt 412 positioned on the top side, the poison bait P is protected from the elements. Further, when used inside or outside, the bottom edge 412' of skirt 412 serves as a stop when securing the station to limit the depth that member 416 may be driven into an object. The poison bait P will thus not be fractured due to being forced against the object to which the station is being secured.

Figure 7:
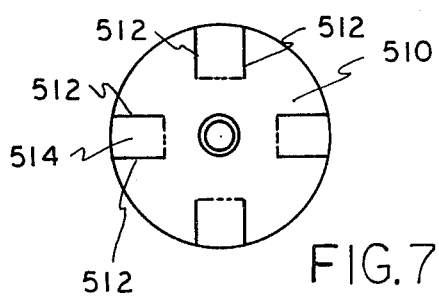
FIG. 7 is a top plan view of a poison station showing a further embodiment for the cover.

A top plan view of a cover 510 is shown in FIG. 7 wherein a plurality of slots 512 are provided therein. Tabs 514 located between the slots 512 may be turned downwardly so as to provide protuberances from the underside of the cover to limit the distance between the poison station and an article to which same is fastened.

Various embodiments of the poison station of the present invention have been described in detail above. In certain of these embodiments particular features were shown. It should be understood that the features, though shown with specific relationship to a particular embodiment of the invention are interchangeable in such a fashion that for all practical purposes, any of the particular features from one embodiment may be used on any of the other embodiments.

Insofar as materials of construction are concerned, the poison stations of the present invention may be manufactured from any material that may be suitably used. For example, the cover sections may be injection molded of a plastic material, may be manufactured from metal, a combination of the two, or the like.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. A poison station for small bugs or the like comprising:
   a. a protective cover;
   b. a member secured to one side of said cover and extending outwardly therefrom;
   c. a unitary poison positioned around said member and secured thereat; and
   d. means to secure said station in position at any attitude, said cover, outwardly extending member and poison being dimensionally cooperative and permitting direct, limited access to said poison around at least a large portion of the periphery of said cover.

2. A poison station as defined in claim 1 wherein said cover comprises a top section and a bottom section, said top and bottom sections having members secured thereto, one of said members telescoping into the other of said members to secure said top section to said bottom section.

3. A poison station as defined in claim 2 wherein said top and bottom sections and the members secured thereto define a fastening member receiving opening through said cover.

4. A poison station as defined in claim 3 wherein a fastening member is provided as a securing means.

5. A poison station as defined in claim 2 wherein at least one of said top and bottom sections have a plurality of protuberances secured thereto and extending outwardly therefrom, said protuberances being of a length such that they come into engagement with the other section to maintain a predetermined distance therebetween.

6. A poison station as defined in claim 2 wherein at least one of said top and bottom sections is provided with an adhesive layer as a securing means.

7. A poison station as defined in claim 2 wherein said members on said sections are threaded for engagement therebetween.

8. A poison station as defined in claim 2 wherein at least one of said top and bottom sections is provided with means to hold said poison in place around said member.

9. A poison station as defined in claim 8 wherein both of said top and bottom sections are provided with poison holding means.

10. A poison station as defined in claim 8 wherein said poison holding means is an annular wedge to bias said poison against said member.

11. A poison station as defined in claim 8 wherein said poison holding means is a plurality of concentric rings.

12. A poison station as defined in claim 1 wherein the outwardly extending member is integral with the cover and has a pointed lower end as a securing means.

13. A poison station as defined in claim 1 wherein the cover is transparent.

14. A poison station as defined in claim 1 wherein the cover has a skirt depending downwardly therefrom, said skirt extending around only a portion of the periphery of said cover and being of a length to extend beyond said unitary poison and engage an object to which the station is secured.

15. A poison station for small bugs or the like comprising:
   a. a cover, said cover comprising a top section and a bottom section, at least one of said top and bottom sections having a member secured to a side thereof and extending outwardly therefrom, said member being removably securable to the other of said top and bottom sections; one of said sections having a layer of a pressure sensitive adhesive substance on at least a major portion of an outer surface; and
   b. a unitary poison positioned around said outwardly extending member and secured thereat, said cover, at least one member and poison being dimensionally cooperative and permitting direct, limited access to said poison around at least a large portion of the periphery of said cover.

16. A poison station as defined in claim 15 wherein both of said top and bottom sections of said cover have members secured thereto and extending outwardly therefrom, one of said members being telescopingly receivable within the other of said members and said top and bottom sections and said members defining a fastening member receiving opening therethrough.

17. A poison station as defined in claim 15 wherein at least said top section of said cover is transparent.

18. A poison station as defined in claim 15 wherein one of said sections of said cover further has a skirt secured thereto and extending outwardly therefrom for only a portion of the periphery thereof, said skirt extending beyond said poison and partially surrounding same.

19. A poison station for small bugs or the like comprising:
a. a cover, said cover having a poison receiving member secured to a central area of one side thereof and extending downwardly therefrom, said member having a large diameter section and a small diameter section, the said small diameter section having a pointed end as a means to secure said station in place, said cover further having at least one protuberance positioned around the periphery thereof and extending downwardly therefrom; and
b. a unitary poison positioned around said large diameter section of said member adjacent said side of said cover and secured thereat, said poison residing above the lower end of said at least one protuberance, said cover, poison receiving member and poison being dimensionally cooperative and permitting direct limited access to said poison around at least a major portion of the periphery of said cover.

20. A poison station as defined in claim 19 wherein said cover is transparent.

21. A poison station as defined in claim 19 wherein said cover is provided with a plurality of slots therein, the portions of said cover between said slots being deformable to provide said protuberances.

22. A poison station as defined in claim 19 wherein said member secured to said cover has a flange intermediate its length, said flange being tapered on one side only whereby said poison may be forced over said tapered side of said flange.

* * * * *